United States Patent
Mcpheat

(10) Patent No.: US 12,252,283 B2
(45) Date of Patent: Mar. 18, 2025

(54) BAG LOADING NOZZLE

(71) Applicant: BFM TECHNOLOGY LIMITED, Auckland (NZ)

(72) Inventor: Blair Forres Mcpheat, North Shore City (NZ)

(73) Assignee: BFM TECHNOLOGY LIMITED, Auckland (NZ)

( * ) Notice: Subject to any disclaimer, the term of this patent is extended or adjusted under 35 U.S.C. 154(b) by 348 days.

(21) Appl. No.: 17/615,183

(22) PCT Filed: May 29, 2020

(86) PCT No.: PCT/IB2020/055098
§ 371 (c)(1),
(2) Date: Nov. 30, 2021

(87) PCT Pub. No.: WO2020/240484
PCT Pub. Date: Dec. 3, 2020

(65) Prior Publication Data
US 2022/0306329 A1    Sep. 29, 2022

(30) Foreign Application Priority Data
May 31, 2019   (AU) ................................ 2019901879

(51) Int. Cl.
*B65B 39/02*   (2006.01)
*B65B 1/06*    (2006.01)
(Continued)

(52) U.S. Cl.
CPC ................ *B65B 39/02* (2013.01); *B65B 1/06* (2013.01); *B65B 1/28* (2013.01); *B65B 39/007* (2013.01); *B65B 59/04* (2013.01)

(58) Field of Classification Search
CPC ......... B65B 39/02; B65B 39/007; B65B 1/06; B65B 1/28; B65B 59/04
(Continued)

(56) References Cited

U.S. PATENT DOCUMENTS 3,106,230 A * 10/1963 Laun ....................... B65B 39/02
                                                         53/570
3,707,172 A    12/1972 Obara
(Continued)

FOREIGN PATENT DOCUMENTS

AU    2007250635    11/2007
CN    2639180       9/2004
(Continued)

OTHER PUBLICATIONS

International Search Report.
(Continued)

*Primary Examiner* — Hemant Desai
*Assistant Examiner* — Mary C Hibbert-Copeland
(74) *Attorney, Agent, or Firm* — Jacobson Holman PLLC

(57) ABSTRACT

A bag loading nozzle to confine a flow of material from upstream feed for downstream discharge into a bag having a spouted entrance. The nozzle comprising an interior wall presenting an inlet and an outlet, located intermediate of the inlet and the outlet and about the interior wall is a shape retaining tube through which the material is to pass from the feed into the bag. At least one actuable fluid inflatable collar at least substantially about the shape retaining tube is provided such that when actuated to its inflated form it will effect at least a substantial sealing with a fitted suitable bag from within its spouted entrance.

17 Claims, 13 Drawing Sheets

(51) Int. Cl.
B65B 1/28 (2006.01)
B65B 39/00 (2006.01)
B65B 59/04 (2006.01)

(58) Field of Classification Search
USPC .......................................................... 53/261
See application file for complete search history.

(56) References Cited

U.S. PATENT DOCUMENTS

| | | | |
|---|---|---|---|
| 5,316,056 | A | 5/1994 | Stott |
| 5,810,060 | A | 9/1998 | Bolz et al. |
| 6,112,504 | A * | 9/2000 | McGregor ............... B65B 39/00 |
| | | | 141/10 |
| 7,168,460 | B2 | 1/2007 | Dietrich et al. |
| 2005/0269356 | A1 | 12/2005 | Norris et al. |
| 2005/0269365 | A1 | 12/2005 | Boroch et al. |
| 2008/0265570 | A1 * | 10/2008 | McPheat ............... F16L 37/025 |
| | | | 285/224 |

FOREIGN PATENT DOCUMENTS

| | | |
|---|---|---|
| CN | 201501534 | 6/2010 |
| CN | 109335136 | 2/2019 |
| EP | 0056701 | 9/1984 |
| EP | 0257683 | 3/1988 |
| FR | 2491880 | 4/1982 |
| FR | 3049268 | 9/2017 |
| GB | 803992 | 11/1958 |
| JP | S62220401 | 9/1987 |
| KR | 102005699 | 7/2019 |
| WO | 2010043336 | 4/2010 |

OTHER PUBLICATIONS

European Search Report.
Australian Search Report.
Chinese Office Action.

* cited by examiner

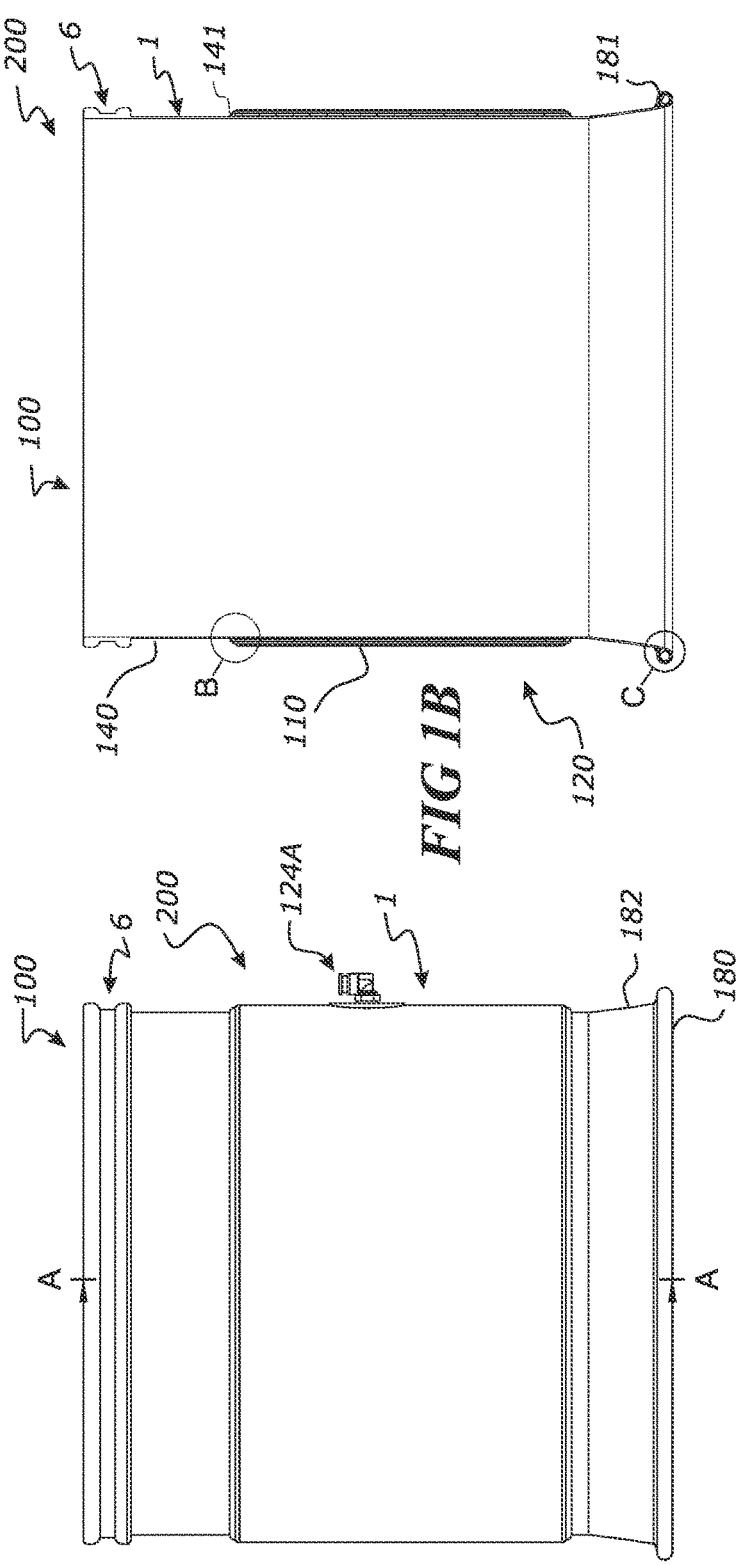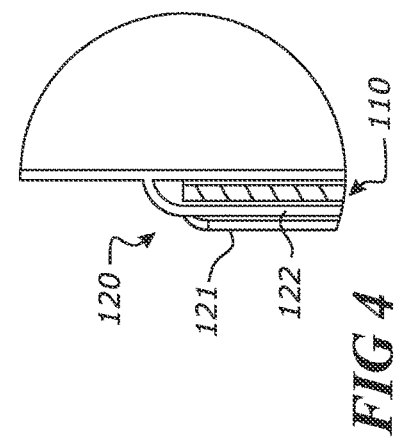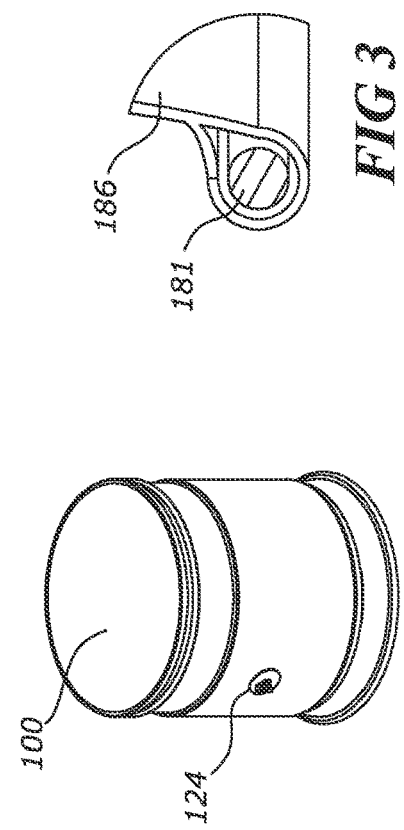

BAG LOADING NOZZLE

SUMMARY OF THE INVENTION

In a first aspect the present invention may be said to be a bag loading nozzle to confine a flow of material from upstream feed for downstream discharge into a bag having a spouted entrance, the nozzle comprising an interior wall presenting an inlet and an outlet, located intermediate of the inlet and the outlet and about the interior wall is a shape retaining tube and through which the material is to pass from the feed into the bag, at least one actuable fluid inflatable collar at least substantially about the shape retaining tube, which when actuated to its inflated form(s) will effect at least a substantial sealing with a fitted suitable bag from within its spouted entrance, and which when deactuated or otherwise deflated, allows the release of the bag from the collar.

The dispensing of material into a bulk bag from a materials processing or storage system is common in many industries. For example, milk powder or sugar may be dispensed into bulk bags at a processing plant so that the material can then be shipped to a remote warehouse or to premises of end use. The dispensing occurs via a nozzle that presents an outlet opening via which the material flows into the bag. The bag has a spout that locates about the nozzle so that the material is entrained by the nozzle and spout as it enters the bag. This helps prevent material spilling. In some installations the nozzle includes an inflation ring that is able to expand and contract around the nozzle. US2005/0269356 shows an example. When expanded the ring presses against the inside of the spout and seals the nozzle to the spout. This helps prevent spillage and is a convenient way to seal the spout to the nozzle. The inflation ring is made from flexible material. It is typically connected to and about a rigid tubular section of the nozzle by a cable tie. These are not easy to use and as the nozzle does need replacing due to wear and tear, there is a need to improve the speed of re attaching a nozzle to the tubular section. In addition the use of a cable tie has been known to result in leakage thereat. In some installations there is an annular hoop positioned about the inflation ring. When the bag is on the nozzle and the inflation ring is expanded, the bag gets trapped between the annular hoop and the inflation ring to help secure it further. However this can create a finger trap for operators.

It may be an object of the present invention to provide a bag loading nozzle which overcomes or at least partially ameliorates some of the abovementioned disadvantages or which at least provides the public with a useful choice.

It may be an object of the present invention to provide a bag loading system which overcomes or at least partially ameliorates some of the abovementioned disadvantages or which at least provides the public with a useful choice.

SUMMARY OF THE INVENTION

In a first aspect the present invention may be said to be a bag loading nozzle to confine a flow of material from upstream feed for downstream discharge into a bag having a spouted entrance, the nozzle comprising an interior wall presenting an inlet and an outlet, located intermediate of the inlet and outlet end and about the interior wall is a shape retaining tube and through which the material is to pass from the feed into the bag, at least one actuable fluid inflatable collar at least substantially about the shape retaining tube, which when actuated to its inflated form(s) will effect at least a substantial sealing with a fitted suitable bag from within its spouted entrance, and which when deactuated or otherwise deflated, allows the release of the bag from the collar.

Preferably the collar fully surrounds the shape retaining tube.

Preferably the collar is inflatable and deflatable via at least one opening.

Preferably the collar is at least part of a flexible bladder.

Preferably a sleeve region extends upstream from the inlet of the shape retaining tube to receive the material(s).

Preferably said sleeve region has a deformable profiled entrance zone to shape retain snap fit within a complementary profiled exit zone of the material feed.

Preferably integral, welded and/or adhered tubular and/or planar sheet material(s) provides at least part of the sleeve region and said collar.

Preferably a sleeve region extends downstream from the outlet of the shape retaining tube.

Preferably the exit of the downstream sleeve region incorporates a shape retaining member.

Preferably the shape retaining member is of circular or cylindrical form.

Preferably the shape retaining member is of a metal or metal alloy.

Preferably the collar comprises of an inner wall and an outer wall that are joined in a manner to create a sealed compartment able to be inflated and deflated.

Preferably the inner wall when the compartment is expanding applies increasing pressure to the outside of the shape retaining member.

Preferably the inner wall is juxtaposed with the shape retaining member.

Preferably the outer wall is located about the inner wall.

Preferably the shape retaining member touches the inner wall.

Preferably during inflation the outer wall expands and away from the inner wall and the shape of the inner wall is retained by the shape retaining member.

Preferably the shape retaining member is retained to the collar.

Preferably the shape retaining member is retained to be presented inside the collar.

Preferably the pneumatic fitting is located in the outer wall.

Preferably the sleeve region extends downstream of the outlet of the shape retaining tube the extended part of the sleeve region including a shape retaining ring located about the outlet of the sleeve region.

Preferably the extended part is in distance long the length of the assembly less than 20% of the total length.

Preferably the extended part is in distance long the length of the assembly less than 10% of the total length.

Preferably the exit zone of the filling apparatus is a profiled tube (first tube) and the sleeve region comprises a deformable profiled tube (second tube) to be nested inside the profiled tube of the exit zone, wherein the second tube is a flexible tube with an end region annularly supported by a band or cuff.

Preferably wherein at the inlet is provided a resiliently inwardly deformable profiled band to be nested inside a profiled tube of or at an exit zone of a bag filler.

Preferably the inlet is provided with an annularly profiled set out, and wherein each of (a) the band and (b) the annularly profiled set out has at least one annular rib directed to the other, and at least one of (a) and (b) has two such ribs so as to have the rib of one engagingly flanked by ribs of the other, and wherein the band is resilient so as to be deformable inwardly of the elongate direction of the nozzle to facilitate insertion or removal of the band from the profiled tube but with sufficient return bias to or towards a more relaxed condition such that the rib between two rib engagement holds the tube and nozzle against axial separation.

Preferably the two such ribs are part of said band or cuff.

Preferably the band or cuff has a resilient cylindrical ring that underlies a profiled ring, that profiled ring providing the ribs of the band or cuff.

Preferably a fold back of a flexible sleeve region of the second tube encloses said profiled ring and cylindrical ring.

Preferably the set out of the first tube has been roll formed.

Preferably the inner surface of the non-set out region of the first tube and the inner surface of the second tube are in alignment and are at least substantially flush one with the other.

Preferably the band or cuff has two parallel annular ribs and the first tube has two parallel complementary grooves that each conform to a said annular rib of the band or cuff and which connect via the rib of the first tube.

In a second aspect the present invention may be said to be a bag loading installation comprising or including material(s) supply apparatus to selectively feed material(s) from a supply or storage out of a profiled tubular exit, a bag loading nozzle as herein described to convey such material(s) when received via the profiled tubular exit into a fitted and inflated collar held bag, such bag loading nozzle snap fitted or snap fitting from within into the profiled tubular exit of said supply apparatus, and a fluid inflator for the inflatable collar.

Preferably inflatable collar or can itself re-inflate the collar.

Preferably the bag loading nozzle is herein described.

In a further aspect the present invention may be said to be a bag loading installation comprising or including material(s) supply apparatus to selectively feed material(s) from a supply or storage out of a profiled tubular exit, a bag loading nozzle as herein described to convey such material(s) when received via the profiled tubular exit into a fitted and inflated collar held bag, such bag loading nozzle snap fitted or to snap fit at it's inlet end into the profiled tubular exit of said supply apparatus, and a fluid inflator for the inflatable collar.

Preferably the nozzle is self contained and other than able to be removably engageable at its inlet end with a bag filling apparatus does not need to rely on the bag filling apparatus to be able to seal with a spout of the bag.

Preferably the nozzle is retrofittable to a bag filling apparatus.

Preferably the inflatable collar is not secured using pipe clamp to the shape retaining member.

Preferably the inflatable collar is located below and/or remote of the outlet of the bag filling apparatus.

Preferably the inflatable collar is located below and/or remote of the bag filling apparatus.

Preferably the shape retaining member is located below and/or remote of the outlet of the bag filling apparatus.

Preferably the shape retaining member is located below and/or remote of the bag filling apparatus.

Preferably the shape retaining member not part of or in direct contact with the bag filling apparatus.

Preferably the collar is not part of or in direct contact with the bag filling apparatus.

Preferably the outlet of the nozzle is of a larger cross sectional area than the cross sectional area of the shape retaining member.

Preferably the outlet of the nozzle is of a larger diameter than the diameter of the shape retaining member.

Preferably the sleeve region at the outlet of the nozzle flares outwardly from the shape retaining member.

Preferably the sleeve region at the outlet of the nozzle flares outwardly from the shape retaining member to a shape retaining ring.

Preferably the sleeve region(s) comprise of flexible film material.

Preferably the collar comprises of flexible film material.

Preferably the interior wall comprises of flexible film material.

Preferably the nozzle is a unit able to be secured and removed from a bag filling apparatus without using tools.

Preferably the nozzle is a unit able to be secured for use to a bag filling apparatus by the snap fit arrangement as herein described.

Preferably the nozzle is a unit able to be secured for use to a bag filling apparatus only by the snap fit arrangement as herein described.

Preferably the nozzle is a unit able to be removed from a bag filling apparatus by the use of snap fit arrangement as herein described.

Preferably the nozzle is a unit able to be removed from a bag filling apparatus only by the use of the snap fit arrangement as herein described.

Preferably the nozzle is a consumable provided as a unit.

Preferably the nozzle is a disposable unit.

Preferably the nozzle provides the interface between the bag spout and the bag filling apparatus.

Preferably the nozzle provides the only interface between the bag spout and the bag filling apparatus.

Preferably the nozzle is generally cylindrical.

Preferably the nozzle is generally of a plastics material or materials save for the shape retaining member, the shape retaining ring and the band.

Preferably the nozzle is a self contained unit that only requires connection to a supply of inflation fluid and to the profiled outlet of the bag filling apparatus to be functional for sealing to the inside of a spout of a bag.

Preferably the inflation fluid is air, provided from a compressed air source.

In a further aspect the present invention may be said to be a method of filling material(s) into a bag, said method comprising or including fitting the bag about a fluid inflatable collar of a bag loading nozzle of a material(s) feed installation, inflating the collar to hold the bag, discharging the material(s) into the bag, and causing or allowing the deflation of the collar to release the material(s) containing bag whether pre or post closure of the bag.

Preferably the method is performed using an installation as herein described.

In a further aspect the present invention may be said to broadly consist in a bag loading nozzle to confine material(s) from upstream feed for downstream discharge into a bag, the assembly comprising or including a shape retaining tube having inlet and outlet ends through which the material(s) is (are) to pass from the feed, and at least one actuable fluid inflatable collar at least substantially about the shape retaining tube, which when actuated to its inflated form(s) will effect at least a substantial sealing and/or holding of a fitted suitable bag from within, and which when deactuated or otherwise deflated, allows the release of the bag from the collar.

Preferably the method is as performed using an installation as herein before described.

Other aspects of the invention may become apparent from the following description which is given by way of example only and with reference to the accompanying drawings.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purposes of this specification, the term "plastic" shall be construed to mean a general term for a wide range of synthetic or semisynthetic polymerization products, and generally consisting of a hydrocarbon-based polymer.

For the purpose of this specification, where method steps are described in sequence, the sequence does not necessarily mean that the steps are to be chronologically ordered in that sequence, unless there is no other logical manner of interpreting the sequence.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.)

BRIEF DESCRIPTION OF THE DRAWINGS

The invention will now be described by way of example only and with reference to the drawings in which:

FIG. 1A shows a bag loading nozzle of the present invention,

FIG. 1B shows a sectional view through section AA of FIG. 1A,

FIG. 2 shows a perspective view of FIG. 1A,

FIG. 3 shows a close up view of region C of FIG. 1B,

FIG. 4 shows a close up view of region B of FIG. 1B,

DETAILED DESCRIPTION OF THE INVENTION

Figure 5:
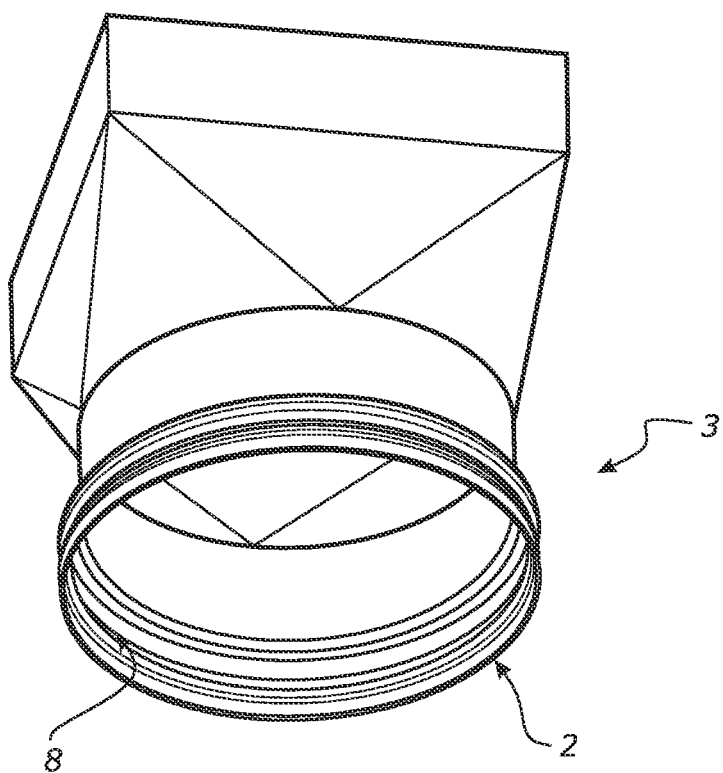
FIG. 5 shows a spigot connector of a tubular exit for materials to be loaded into a bag via the bag loading nozzle.

In the preferred form of the present invention the bag loading nozzle 200 is shown in FIG. 1A. It may assume a tubular form able to be retained substantially in its tubular ducting form so as to provide a wall 1 able to be substantially aligned with a wall 2 of a profiled tubular exit of a bag filling apparatus. Preferably at the top of the bag loading nozzle 200 there is an entrance zone 100 comprising of a band 6 or bands 6 and 7 respectively adapted to conform and engage outwardly into a complementary profiled region 8 of the profiled tubular exit 3 of a hopper or other plant equipment acting as a bag filler apparatus. Details of the entrance zone 100 will hereinafter be described.

Figure 26A:
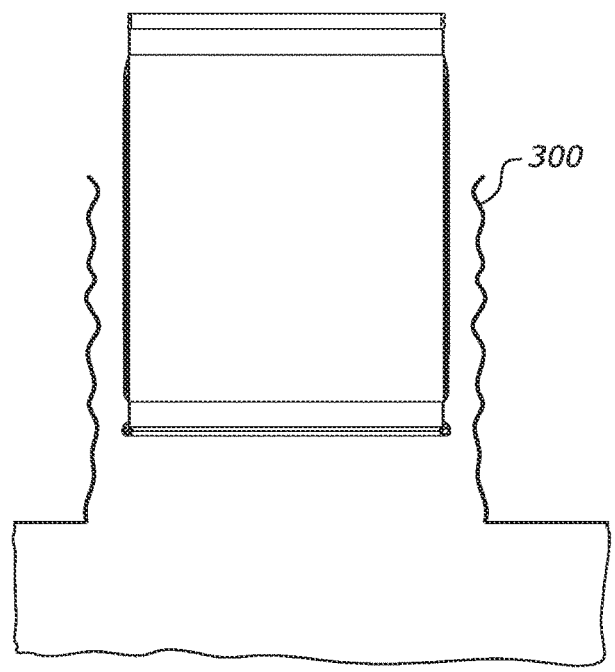
FIG. 26A shows the collar in a collapsed condition with a bag spout in location.
Figure 26B:
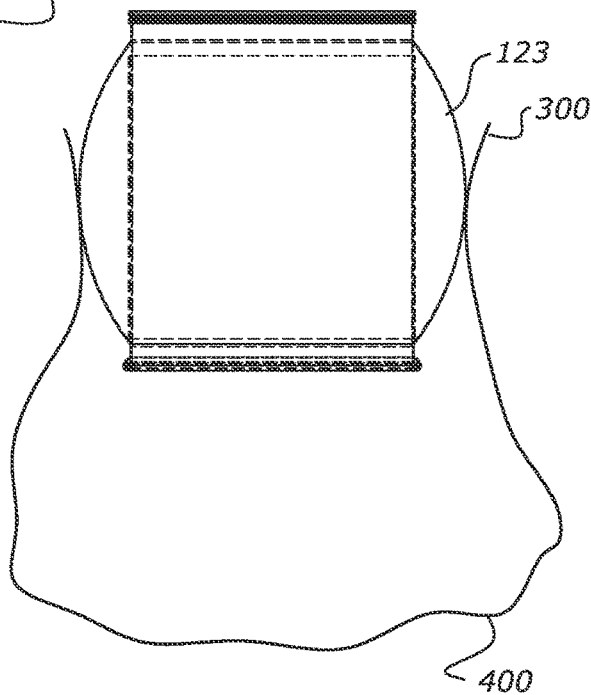
FIG. 26B shows the collar expanded and the bag spout in location, sealed about and to the collar.
Figure 26C:
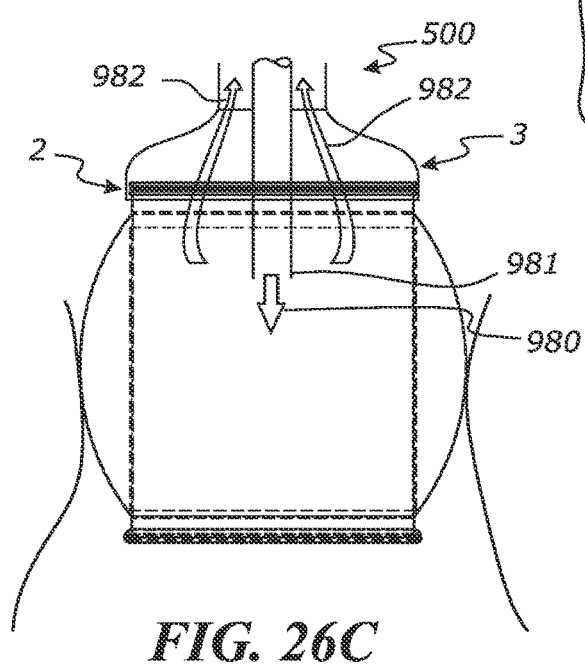
FIG. 26C shows the direction of material flow downwards and the extraction of air from the bag upwards.
Figure 27:
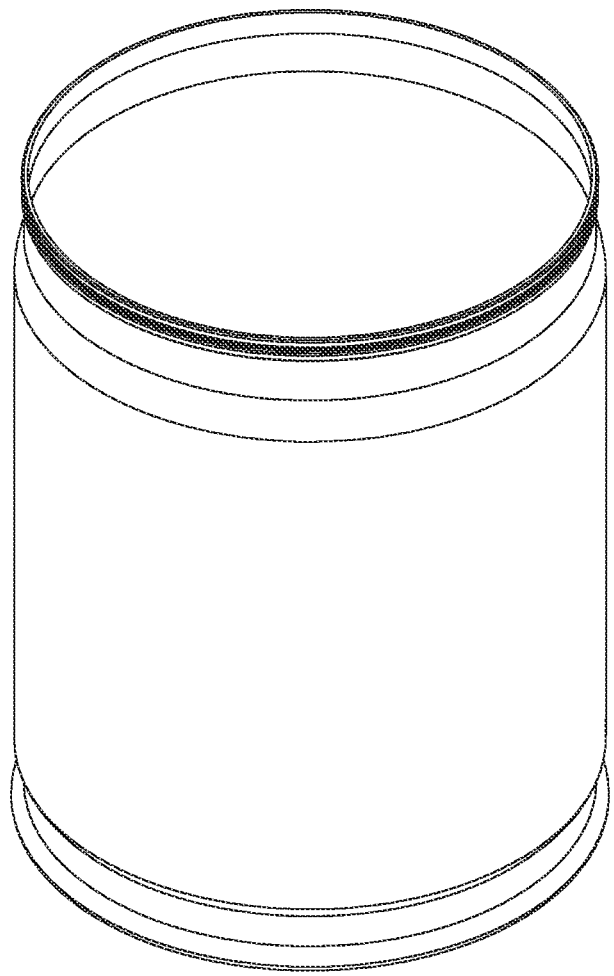
FIG. 27 shows the collar in a collapsed condition showing the bag loading nozzle in a perspective form.

The bag loading nozzle 200 comprises of a wall of an assembly of layers. The wall is partly able to outwardly expand and contract reliant on compressed air that may be delivered and removed via a pneumatic fitting 124. As seen in FIG. 1A, the wall is in a contracted condition whereas in FIGS. 28A and 29, the wall 1 is an expanded condition. In a contracted condition a spout 300 of a bulk bag 400 is able to locate and be located about at least part of the bag loading nozzle 200 as seen in FIGS. 26A and 38. In the expanded condition of the wall the bag loading nozzle is sealingly engaged with the spout 300. The size of the spout is commensurate the expanded wall of the nozzle. Material 980 can then be caused to flow through the bag loading nozzle 200 from equipment 500 such as a hopper or other plant equipment into the bag 400 via the bag loading nozzle. The equipment may present a pipe 981 that may extend at least some way into the loading nozzle. The material flowing out of the pipe may be flow entrained to some extent so that the material passes through the nozzle without significantly flowing over the inside of the nozzle. The diameter of the pipe 981 is less than the internal diameter of the nozzle. Air in the bag or delivered into the bag with the materials being loaded, is able to be displaced from the bag via flow path(s) 982 that may be provided about the pipe 981. Once the bag is loaded with material to a desired level, the wall can be collapsed and contracted to then allow for the spout 300 to slip off the bag loading nozzle 200 wherein the bag can then be optionally sealed. In some applications the bag may be first sealed before it is removed from the bag loading nozzle and before the wall is contracted. The bag loading nozzle hence is able to confine material flowing from upstream for feeding downstream and being discharged into a bag.

Figure 29:
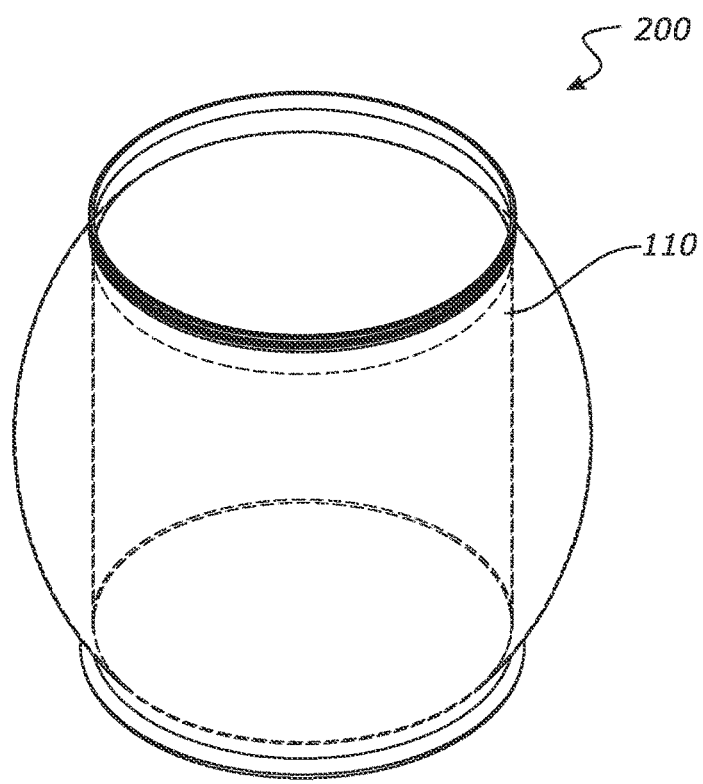
FIG. 29 shows the bag loading nozzle in an expanded condition in perspective view.

The nozzle preferably comprises of a shape retaining tube 110. The shape retaining tube is preferably of a rigid material and may be made from an alloy or steel or a composite material. It is preferably cylindrical in shape as can be seen in FIG. 29. About the shape retaining tube of the wall is a collar 120.

The collar 120 preferably comprises of an outer wall 121 and an inner wall 122. These together create a bladder or compartment flexible in volume. The inner and outer wall 122/121 define a sealed compartment 123 that has a opening or opening 124 via which compressed air can be delivered into the sealed compartment 123. The opening 124 may also be the opening via which compressed air is able to exit the compartment 123. A pneumatic fitting 124A may be provided. It is preferably located through the outer wall 121. When compressed air is introduced into the compartment 123 the outer wall 121 is able to expand away from the inner wall 122. The inner wall 122 is prevented from bellowing inwards by the shape retaining member 110. This ensures that a non-deformable duct path is maintained through the bag loading nozzle of the present invention. The path is preferably cylindrical. When inflated the outer wall 121 seals or is able to seal with a spout 300 of a bag. The seal may be a strong seal to prevent material being discharged into the bag from blowing out through the spout of the bag.

Figure 28A:
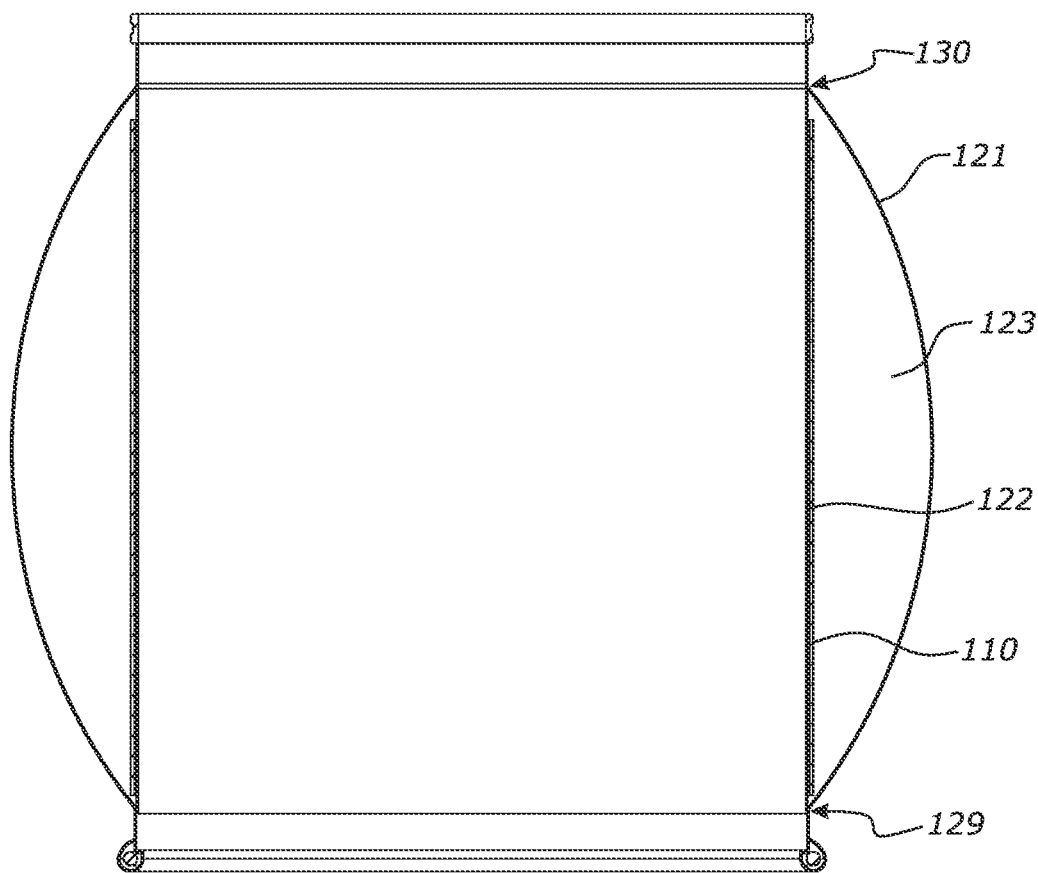
FIG. 28A is a section through CC of FIG. 25.

The inner and outer walls of the collar are preferably made from a flexible material such as a plastic material and are bonded to each other at the bond regions 129 and 130 as seen in FIG. 28A. The material is preferably a polyurethane. Both the inner and outer walls, when the collar is in the collapsed condition, are shown in FIG. 1A substantially of a cylindrical format. When compressed air is introduced into the compartment 123 the inner wall remains in a cylindrical format whereas the outer wall 121 bellows out to or towards a spherical or partially spherical form. It's diameter in parts hence increases. In use, the bag loading nozzle engaged with a profiled tubular exit of a hopper or other plant equipment is able to confine material flowing from upstream of the bag loading nozzle into a bag. This is able to be achieved in a manner to entrain the material being discharged to ensure that leakage to the environment about the bag of material is reduced or prevented. This is because of the seal able to be established between the collar and the spout of the bag. This expansion and contraction of the collar is rapid and allows for fast operation of the equipment for bag loading. A foot switch may be provided to operate the pneumatics for collar expansion and contraction. There is preferably no objects, such as an annular hoop about the collar that could otherwise create pinch points for an operator.

The bag loading nozzle is engaged to the profiled tubular exit of the plant equipment reliant on deformable profiled entrance 100 located at one end of the bag loading nozzle. The deformable profiled entrance forms part of the bag loading nozzle and is an entrance to the passage through the bag loading nozzle. It is part of a sleeve region 140 that extends upstream from the inlet 141 of the shape retaining tube. The sleeve region has a deformable profile entrance to shape retain snap fit within a complimentary profile exit zone 3 of the plant equipment.

The nozzle also comprises a discharge end 180. This is preferably also made of a flexible material, but may incorporate a rigid ring or band 181. This ring or band 181 helps to keep a desired shape of the exit 180 such as a circular form. The exit sleeve region 182 is preferably also a plastic film material. It is preferably a plastic film material that extends continuously to the sleeve region 140 at the entrance zone. The exit and entrance sleeve regions are preferably provided as a continuation of the interior wall 186 as will herein after be described. The discharge end as can be seen in FIG. 1A is flared. It is preferably flared outwards. The exit diameter of the nozzle is preferably greater than the diameter of the shape retaining member 110. The flare occurs preferably downstream of the shape retaining member 110. The flare helps keep the shape of the end of the nozzle. It helps prevent the bag from sucking into the nozzle, which there may be a propensity for when the bag is being loaded and there suction applied to the back for the removal of air from the bag is it is getting filled with material. The flare also moves the exit of the nozzle out of the way of the flow of materials going into the bag thereby helping to reduce material wearing of the end of the nozzle.

Figure 30:
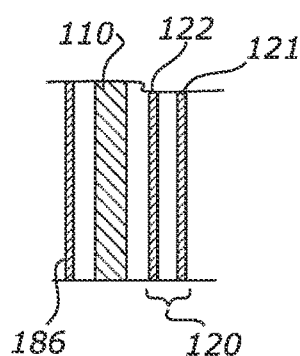
FIG. 30 is a section through section EE of FIG. 25 showing the collar in a collapsed condition.
Figure 31:
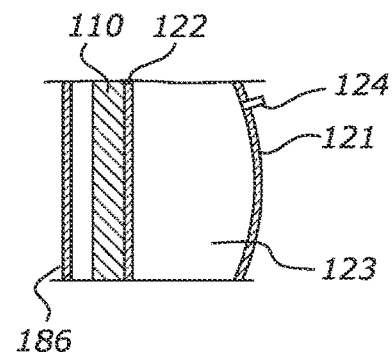
FIG. 31 is a section through section EE of FIG. 25 showing the collar in an expanded condition.
Figure 32:
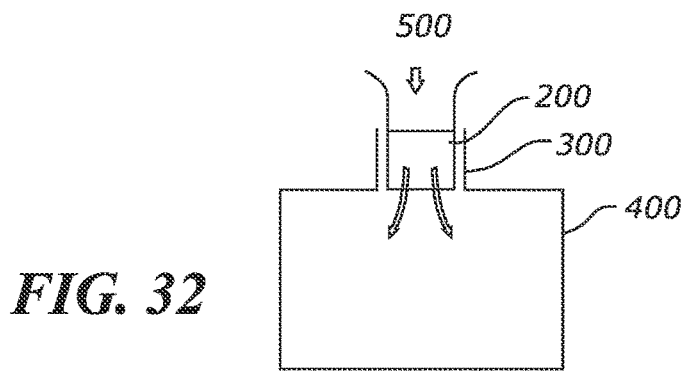
FIG. 32 shows the collar located in a spout of a bag pre or post loading of material into the bag where the collar is shown in a collapsed condition.

The interior wall 186 is for example seen in FIGS. 30 and 31 and may sit inside of the shape retaining tube 110. It may hence help trap or capture the shape retaining tube 110 in position relative to the collar. Alternative ways of ensuring that the shape retaining collar remains in position relative to the collar are also envisaged and may not require for a capturing of the shape retaining collar by the interior wall 186. The shape retaining tube may be retained relative to the collar in other ways such as by adhesion to the inner wall 122 or other forms of secure or fastening or locating or holding the shape retaining tube in location.

The wall 186 is preferably continuous over the length of the tube between the entrance and exit. The wall may roll over the ring 181 as seen in FIG. 3. The provision of a continuous wall on the inside of the nozzle helps reduce wear of the nozzle from material flow and helps reduce entrapment of material.

Figure 6:
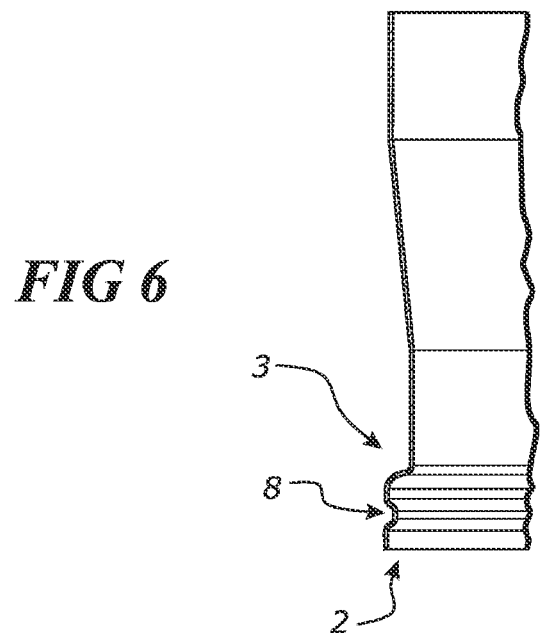
FIG. 6 is a cross-section of the spigot connector of FIG. 1B.

Shown in FIG. 6 is an annular channel set out from the ducting locus, such channel being shown as 11, an inwardly directed and annular rib 12 set out less than the channel 11 and an annular set out rebate (but it could be a channel) 13 out from that annular rib 12.

Figure 9:
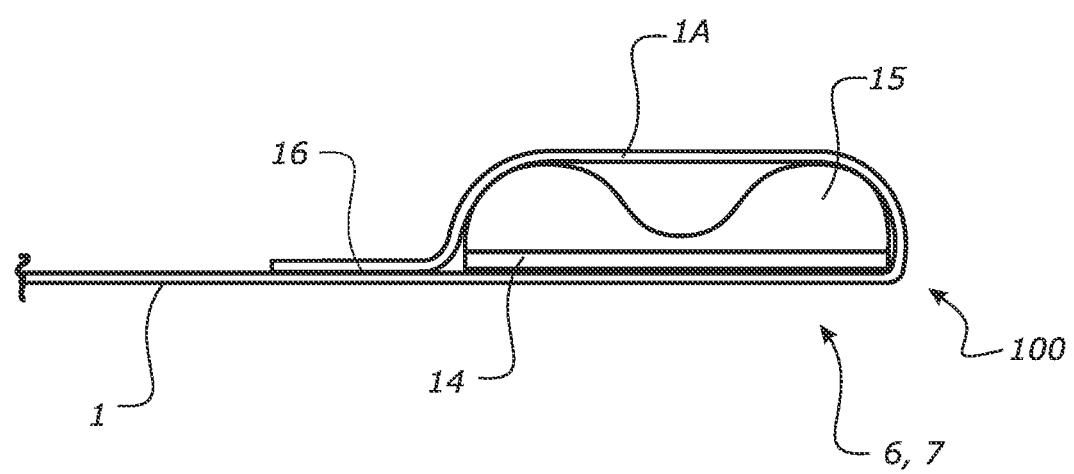
FIG. 9 shows one end of a bag loading nozzle showing the profiling for engagement with the spigot.

The entrance zone 100 as shown in FIG. 9 comprises the sleeve region of the preferred material of the nozzle. This material is preferably at least substantially, if not totally, gas impervious as its role is to convey particulate materials rather than to separate particulate materials from any air or gas that may be moving therewith, whether as an entrainment flow or not.

Figure 7:
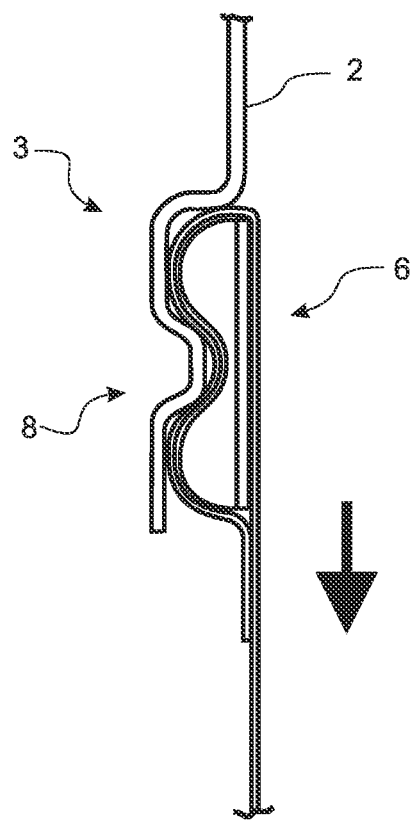
FIG. 7 shown by reference to a diagrammatic section, part of a bag loading nozzle, a spigot connection, the connection relying on profiling of the nozzle and the spigot connection and the complementary engagement thereto in an outwardly biased manner a complementary profile of the banded or ferruled region at the end of the bag loading nozzle.
Figure 8:
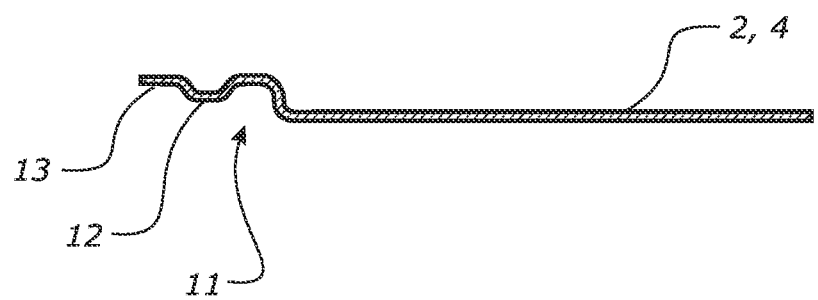
FIG. 8 is a sectional view of part of a tubular exit to show the features of the end profiling thereof.

The wall 186 extends to a fold-back 1A from which it can be deformed inwardly as in the inter-engagement form shown in FIG. 7.

The cuff region at the band or ferrule 6 or 7 as shown, which is to act to the outside in its inter-engagement, has a surround first of a resilient ring 14 as a snap band and there over a profiled ring 15. The assembly of member 15 about the snap band 14 has been captured onto the material 1 by the fold back 1A which is then attached by adhesively and/or stitching at 16.

Members 14 and 15 need not be adhered one to the other but can be if desired.

Such an arrangement shown in FIG. 9 is then able to inter-engage in a holding engagement with the interior profile of region 8 of exit 3.

Figure 10:
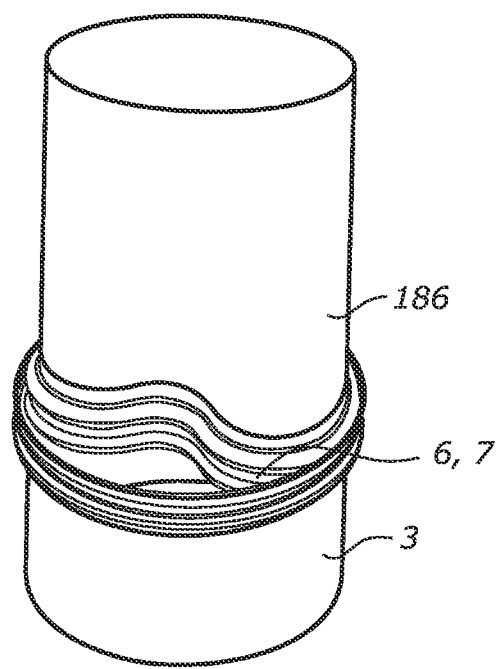
FIG. 10 shows the manual deformation of one end of the bag loading nozzle of a flexible entrance zone of the bag loading nozzle to allow its "snap" placement within the profiled end region of a tubular exit with a complementary profile.
Figure 11:
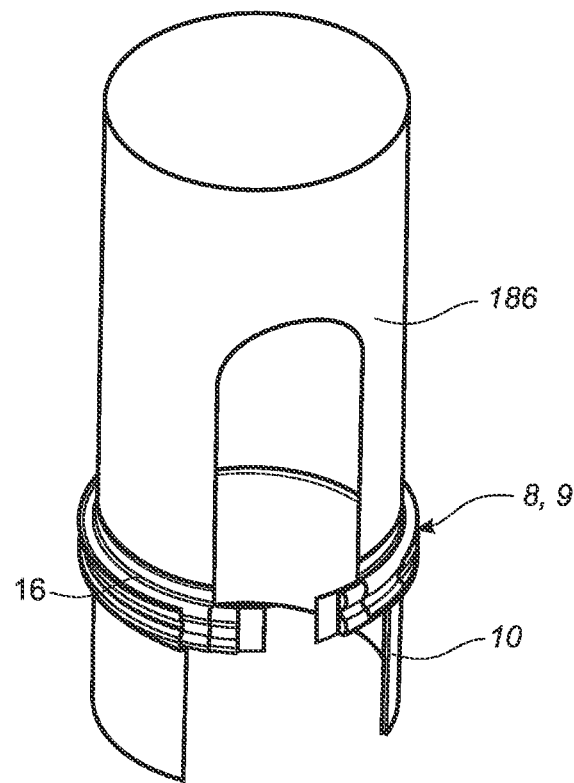
FIG. 11 shows the bag loading nozzle engaged within complementary profile in part being cut away to show more.
Figure 12:
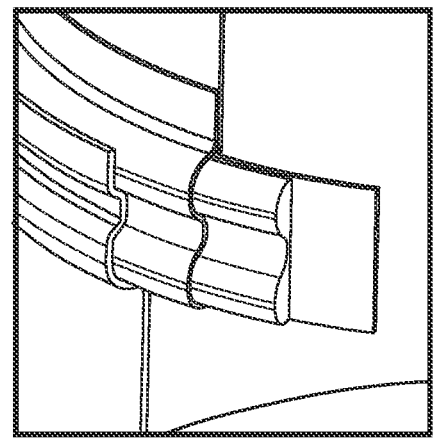
FIG. 12 is an enlargement of part of FIG. 11.
Figure 13:
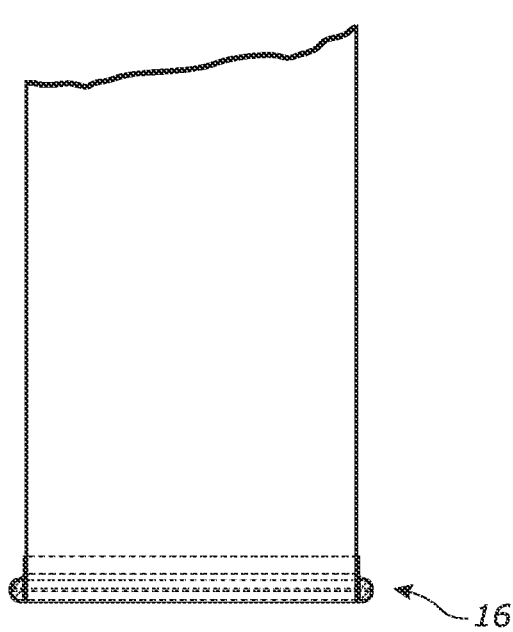
FIG. 13 is a side elevation of an alternative bag loading nozzle this time having similar ends but each of which has a single annular rib supported by a flexible member.
Figure 15:
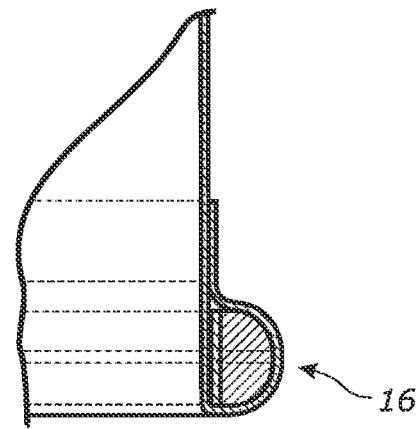
FIG. 15 is a sectional view of part of the section of the entrance zone at the single annular rib.
Figure 14:
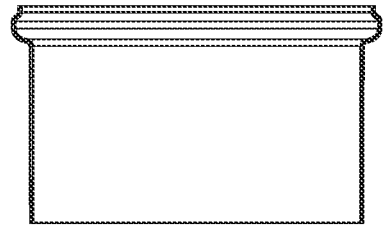
FIG. 14 shows the complementary profile spigot to receive either end of a connector of FIG. 13.
Figure 16:
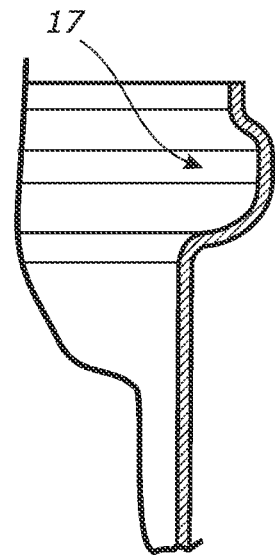
FIG. 16 is an enlargement of the complementary profile of the spigot connector of FIG. 14.
Figure 17:
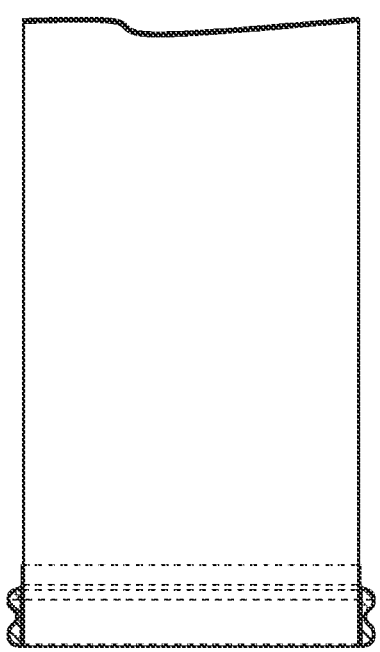
FIG. 17 is a similar diagram to that of FIG. 13 but of a double annular ribbed flexible entrance zone of a kind substantially as previously described.
Figure 18:
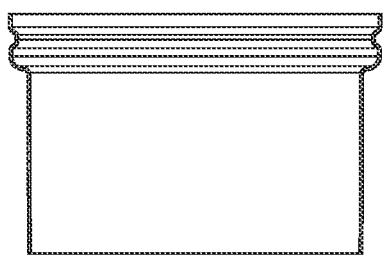
FIG. 18 is a complementary spigot connector for the entrance zone of FIG. 17.
Figure 19:
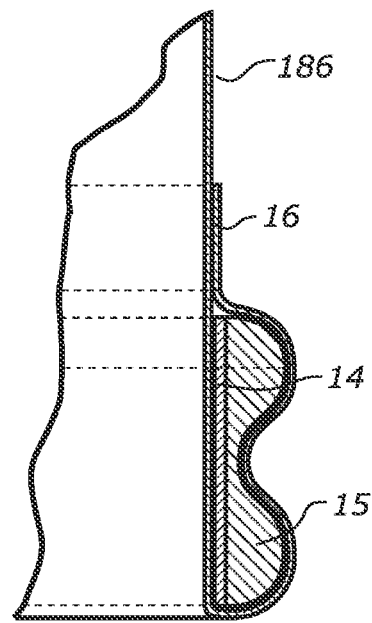
FIG. 19 is a cross-sectional enlargement of the double annular rib of the entrance zone of FIG. 17.
Figure 20:
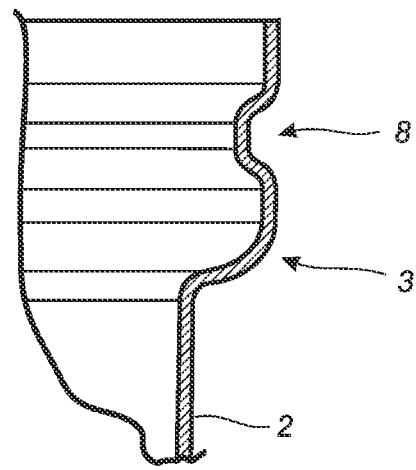
FIG. 20 is an enlargement of the profile of the spigot connector of FIG. 18.
Figure 21:
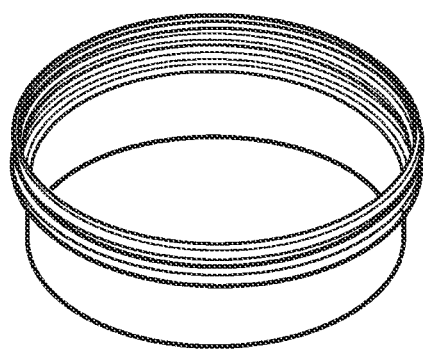
FIG. 21 is a perspective view of a most preferred form of the spigot connector.
Figure 22:
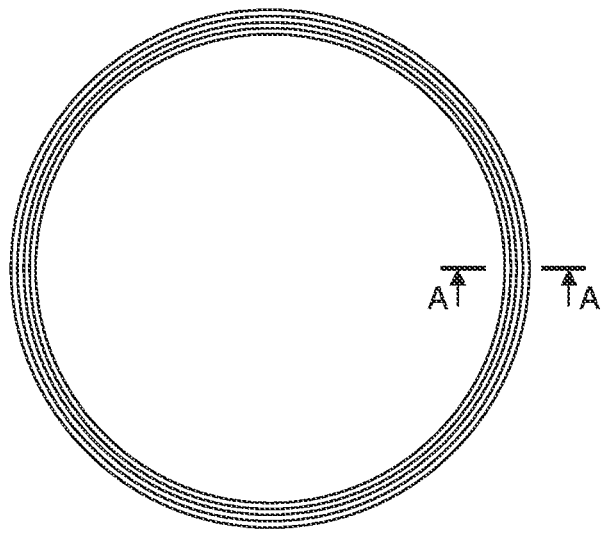
FIG. 22 is a plan view of the spigot connector of FIG. 21.
Figure 23:
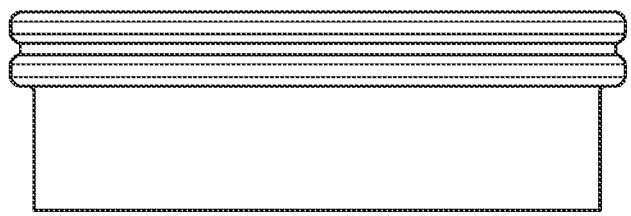
FIG. 23 is an elevational view of the spigot of FIGS. 21 and 22.
Figure 24:
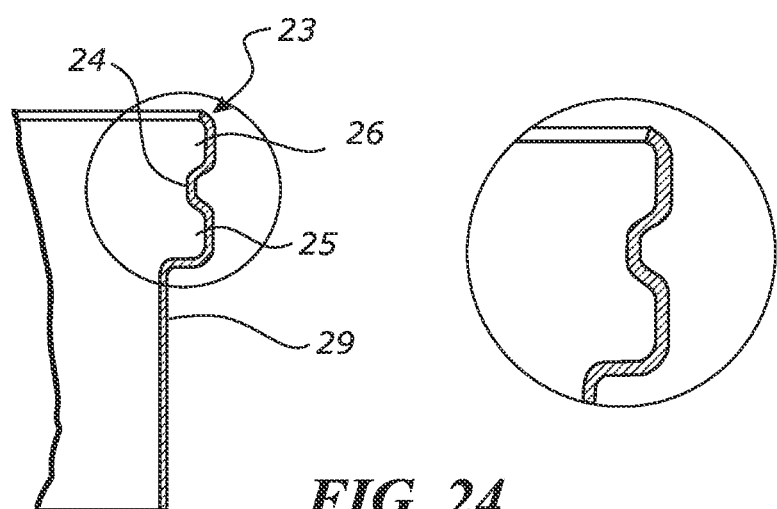
FIG. 24 is the detail at section AA of FIG. 22 when being viewed in elevation.
Figure 25:
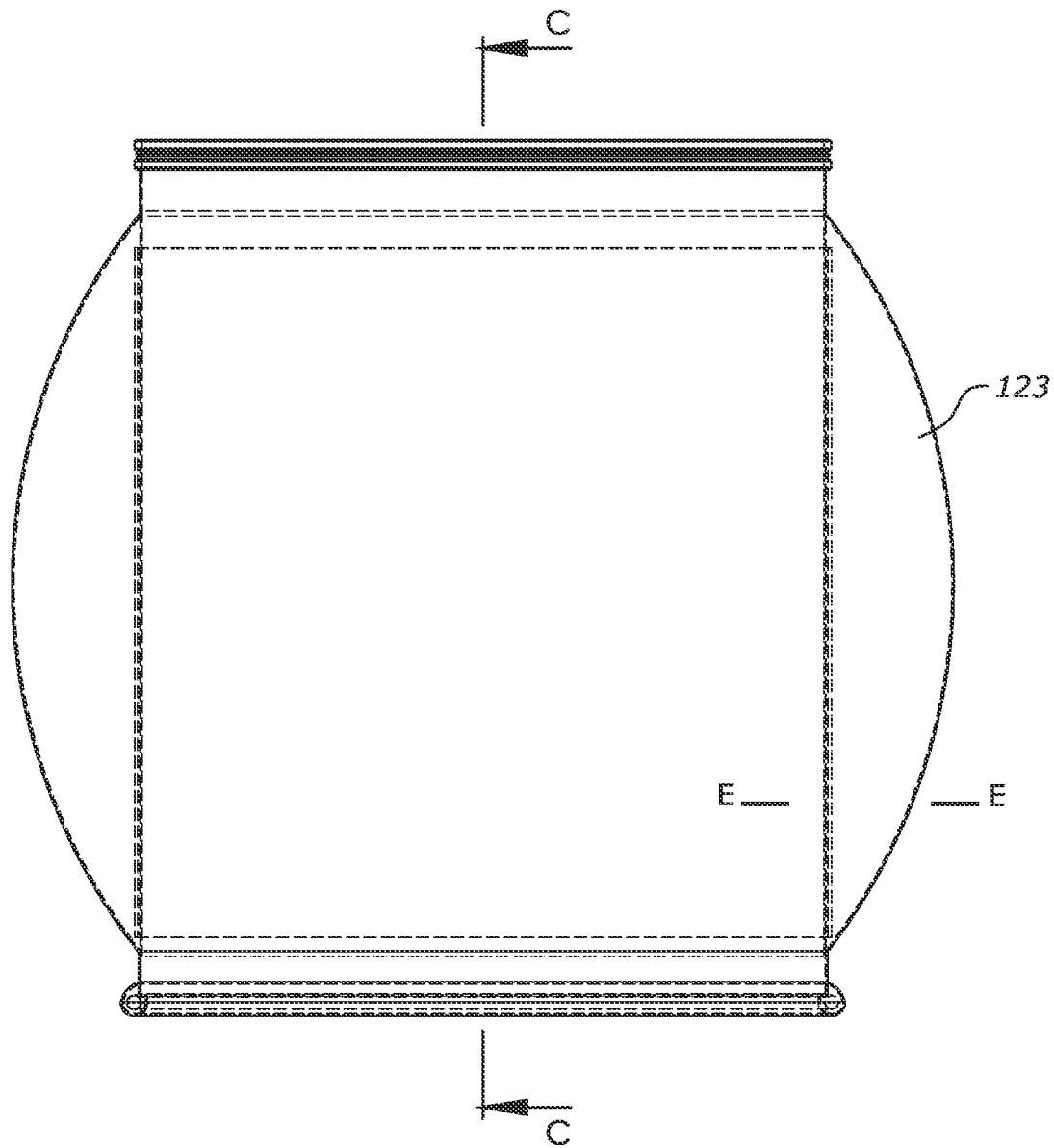
FIG. 25 shows the bag loading nozzle in an expanded condition wherein the collar has been inflated.

A preferred method of inter-engaging is as shown in FIGS. 10-12. The inflation collar has been removed from these drawings for clarity. As seen there is a profiled tubular exit 3 or spigot of the equipment having an end region at 6 or 7 to receive a flexible ring fitted there into reliant upon the deformability and resilience of the snap ring or band 14.

Upon release from the condition as shown in FIG. 10 a firm inter-engagement as shown in FIG. 7 will result. To remove the flexible ring from the inter-engagement as shown in FIG. 1d there is a similar distortion required to enable its ready removal.

In preferred forms of the present invention a suitable plastics material can be used for the band 15. It is shape retaining but can be resilient so that it can conform to the deformation required of the snap band 14 which preferably is of a suitable material e.g. a suitable steel (preferably stainless steel) or could be some appropriate composite or plastics material.

May different materials single or multiple can be used for the flexible seal. One choice for the flexible sleeve region proper is Clearflex™ sleeve region material which a plastics material having little resilience but being flexible.

Depending on usage the nozzle may be made to a food grade material or materials.

Alternative materials to any of those described can be used. There is no need for the material of the discharge connector assembly to be homogeneous, i.e. it can have localised regions of different properties (e.g. material, rigidity, etc) if that is desirable in a particular application.

A person skilled in the art will appreciate how with the substantial flushness possible as shown in FIG. 7 there is little in the way of collection areas for particulate materials such as food powders. These should be easily dislodged by regular cleaning without disassembly in conjunction with possible vibrational nature of the structure. Periodic removals of the flexible tube are easy as there is no encircling hose clamp to remove and replace. Removal and replacement is simple.

Whilst there has been description of a particular profiling of the end of each of the tubes in question, other profiled end forms are within the scope of the invention that provide for appropriate retention. These may include one or more annular rib. They may include one or more channel. It is preferred that the profiling be of an annular nature rather than helical or otherwise.

It is believed that the present invention provides industry with a useful alternative to existing apparatus and methodologies.

FIGS. 13 through 16 as described show a single annular rib 16 adapted to be received by a complementary profile. Each rib is analogously made to the twin rib form already described.

Similar set outs etc. 17 exist for the single annular rib inter engagement as for the double annular rib inter engagement previously described.

FIGS. 17 through 20 show in a similar style to FIGS. 13 to 16 a double annular rib series of drawings.

Irrespective of whether or not the annular connector is single ribbed at one end or double ribbed, or as a hybrid of both, persons skilled in the art will appreciate how the system works.

FIGS. 21 through 24 shows a preferred form of the spigot or ferrule. It can be of a metal (steel or SS) plastic or a combination of materials. This form has an in-turned region 23 thus meaning that the inwardly directed ridge 24 separates two complete annular retention grooves 25 and 26 able to accommodate respectively parts 27 and 28 respectively of a discharge connector assembly end.

This shaping of the distal part to match the nozzle does two things—it ensures a seal on two lips (27 and 28) and ensures less gap with the discharge connector assembly exteriorly to collect dust and dirt.

Figure 28B:
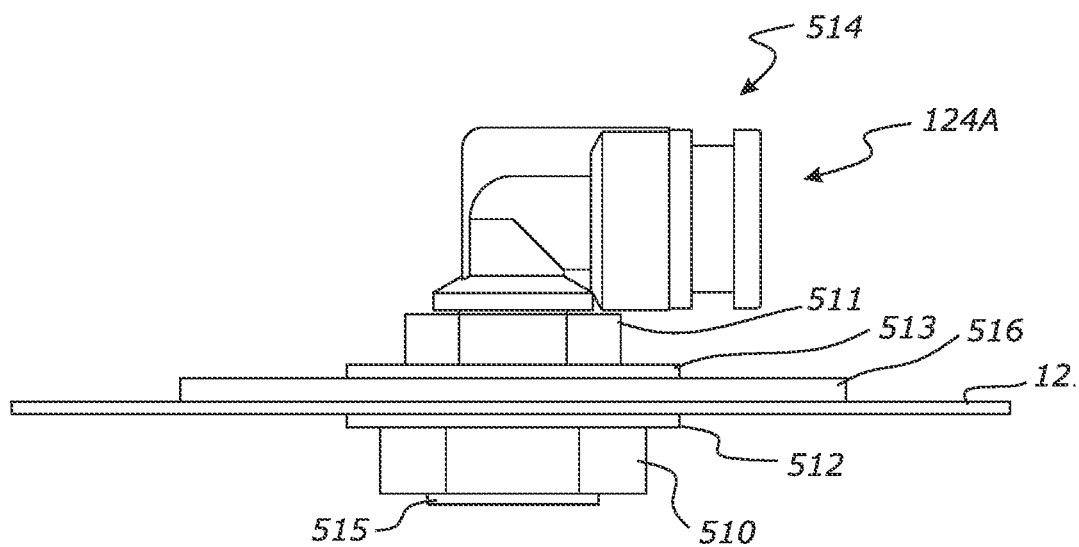
FIG. 28B shows a side view of the inflation/deflation fitting for the collar located through the collar wall.

The inflation fitting 124A is located through the wall of the collar 121. FIG. 28B shows this as an example. The fitting may include a coupling 514 with which a coupler of a pneumatic hose can releasable engage. The fitting may include a threaded tube 515 that passed through the collar wall. An internal nut 510 and washer 512 may be provided to cooperate with an external nut 511 and washer 513 to secure the fitting to the collar. The securing is such as to create an air-tight seal with the collar. An adhesive or sealant may be used. Preferably such is food grade. A Scrim 516 may be provided as a patch to help spread point loading of the fitting with the collar so as to help increase the longevity of the collar under repeated expansion and contraction cycles. The scrim 516 may be captured between the washer 513 and the collar 121 as seen in FIG. 28B. The scrim may be made from an ether based PU Polyester reinforced. It may go by the trade name Seeflex 060ES™. The collar may be made from an ether based PU such as Seeflex 040E™. It may instead be a stretch ether base PU such as MT-1001. The ring 181 may be a 304 stainless. The wall 186 may be an ether based PU such as Seeflex 040E. it may be 0.9 mm thick. The wall 122 may be of the same material. Heat and/or ultrasonic welding may be used to connect the walls together.

The snap fit arrangement between inlet of the nozzle and the spigot as herein describe may be as described in PCT international application WO2007133094, the entire contents of which is hereby incorporated by way of reference.

The arrangement as described provides for good hygiene because the design ensures a tight fit, little or no crevices, little or no build up of product and prevents leakage of materials from the bag during filling. Furthermore the arrangement is less susceptible to damage as no hose clips needed to secure the inflation collar to the equipment and no tools are needed and hence there is no damage as a consequence.

The nozzle is able to be interchanged quickly from the equipment. This means that if a new nozzle is required to be used because of damage or wear on the previous nozzle, this can be done easily, quickly and without the need to use tools. The old nozzle can be snapped out and the replacement can be snapped in. Nozzle replacement may also be required in cases where a different inflation profile of the collar is needed. Such as for example if a bag of a different sized spout is to be loaded.

A series of inflatable collars may be provided along the longitudinal direction of the nozzle. Each may be able to be collectively or separately inflated and deflated.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

The invention claimed is:

1. A bag loading nozzle to confine a flow of material from an upstream feed for a downstream discharge into a bag having a spouted entrance, the nozzle comprising an interior wall presenting an inlet and an outlet, through which the material is to pass from the feed into the bag, a shape retaining tube made from rigid material located intermediate of the inlet and outlet and about the interior wall, and at least one actuable fluid inflatable collar at least substantially about the shape retaining tube, which when actuated to its inflated form will effect at least a substantial sealing with a fitted suitable bag from within its spouted entrance, and which when deactuated or otherwise deflated, allows the release of the bag from the collar, wherein a sleeve region extends downstream of an outlet of the shape retaining tube as a continuation of the interior wall, the interior wall and the sleeve region being made from a flexible material the extended part of the sleeve region including a rigid shape retaining ring located about the outlet of the interior wall and the sleeve region, and wherein the nozzle is removably engageable with a bag filling apparatus at the inlet.

2. The nozzle of claim 1 wherein the actuable fluid inflatable collar fully surrounds the shape retaining tube.

3. The nozzle of claim 1 wherein the actuable fluid inflatable collar is inflatable and deflatable via at least one opening.

4. The nozzle of claim 1 wherein the shape retaining tube is of circular or cylindrical form.

5. The nozzle as claimed in claim 1 wherein the actuable fluid inflatable collar comprises an inner wall and an outer wall that are joined in a manner to create a sealed compartment able to be inflated and deflated.

6. The nozzle as claimed in claim 5 wherein the inner wall when the compartment is expanding applies increasing pressure to the outside of the shape retaining tube.

7. The nozzle as claimed in claim 5 wherein the inner wall is juxtaposed the shape retaining tube.

8. The nozzle as claimed in claim 7, wherein the outer wall is located about the inner wall.

9. The nozzle as claimed in claim 5, wherein the shape retaining tube touches the inner wall.

10. The nozzle as claimed in claim 5, wherein during inflation the outer wall expands away from the inner wall and the shape of the inner wall is retained by the shape retaining tube.

11. The nozzle as claimed in claim 1, wherein the shape retaining tube is retained by the actuable fluid inflatable collar.

12. The nozzle as claimed in claim 1, wherein the shape retaining tube is retained between the actuable fluid inflatable collar and the interior wall.

13. The nozzle as claimed in claim 1, wherein at the inlet is provided a resiliently inwardly deformable profiled band to be nested inside a profiled tube of or at an exit zone of the bag filling apparatus.

14. A bag loading installation comprising a material supply apparatus to selectively feed material from a supply or storage out of a profiled tube of or at an exit zone of the material supply apparatus, the bag loading nozzle of claim 1 is removably attached to the profiled tube to convey such material when received via the profiled tube into a fitted and inflated collar held bag, such bag loading nozzle snap fitted or snap fitting from within into the profiled tube of the material supply apparatus, and a fluid inflator for the actuable fluid inflatable collar.

15. The bag loading installation of claim 14 wherein the fluid inflator overcomes a leakage of the actuable fluid inflatable collar or can itself re-inflate the actuable fluid inflatable collar.

16. A method of filling material into a bag performed using the bag loading installation of claim 14, the method comprising fitting the bag about the actuable fluid inflatable collar of the bag loading nozzle removably attached to a material supply apparatus, inflating the collar to hold the bag, discharging the material into the bag, and causing or allowing the deflation of the actuable fluid inflatable collar to release the material containing bag whether pre or post closure of the bag.

17. The bag loading nozzle as claimed in claim 1, wherein the extended part of the sleeve region is flared outwards.

* * * * *